(12) United States Patent
Minoshima et al.

(10) Patent No.: US 9,435,392 B2
(45) Date of Patent: Sep. 6, 2016

(54) PARKING BRAKE CONTROL DEVICE FOR TRANSPORT VEHICLE

(71) Applicant: Hitachi Construction Machinery Co., Ltd., Tokyo (JP)

(72) Inventors: Toshikazu Minoshima, Tsuchiura (JP); Katsumi Tamura, Tsuchiura (JP); Takao Kurosawa, Tsuchiura (JP); Yudai Itai, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 10 days.

(21) Appl. No.: 14/375,247

(22) PCT Filed: Nov. 30, 2012

(86) PCT No.: PCT/JP2012/081166
§ 371 (c)(1),
(2) Date: Jul. 29, 2014

(87) PCT Pub. No.: WO2013/121651
PCT Pub. Date: Aug. 22, 2013

(65) Prior Publication Data
US 2014/0374199 A1 Dec. 25, 2014

(30) Foreign Application Priority Data
Feb. 16, 2012 (JP) .................. 2012-031916

(51) Int. Cl.
*F16D 65/14* (2006.01)
*B60T 7/12* (2006.01)
*B60T 13/22* (2006.01)
*F16D 121/20* (2012.01)

(52) U.S. Cl.
CPC .............. *F16D 65/14* (2013.01); *B60T 7/12* (2013.01); *B60T 13/22* (2013.01); *F16D 2121/20* (2013.01)

(58) Field of Classification Search
CPC .... B60T 7/122; B60T 8/245; B60T 2201/06; F16D 65/14
USPC ............. 303/119.1, 132, 157, 158, 191, 192, 303/117.1, 89, DIG. 2
See application file for complete search history.

(56) References Cited

U.S. PATENT DOCUMENTS

| 2005/0177288 A1* | 8/2005 | Sullivan ................ B60W 50/02 701/36 |
| 2006/0152079 A1* | 7/2006 | Werner .................... B60T 7/12 303/191 |

(Continued)

FOREIGN PATENT DOCUMENTS

| JP | 50-128065 A | 10/1975 |
| JP | 60-143066 U | 9/1985 |

(Continued)

*Primary Examiner* — Robert A Siconolfi
*Assistant Examiner* — Charles Poon
(74) *Attorney, Agent, or Firm* — Crowell & Moring LLP

(57) ABSTRACT

A parking brake control device for a transport vehicle is attached to a vehicle body including a parking brake (17) of a negative control type for maintaining a state in which rotation of wheels is stopped, the parking brake control device including a control unit (32) for controlling movement of a spool (21) for magnetizing or demagnetizing a solenoid valve (25) to release or actuate the parking brake (17). The control unit (32) includes a stop determining section (33) that determines whether the vehicle body stops traveling, an actuation command section (34) that actuates the parking brake (17) when the stop determining section (33) determines that the vehicle body is stopped, and a release command section (35) that releases the parking brake (17) after elapse of a preset setting time after the actuation of the parking brake (17) is started by the actuation command section (34).

8 Claims, 4 Drawing Sheets

(56) References Cited

U.S. PATENT DOCUMENTS

| | | | |
|---|---|---|---|
| 2006/0186731 A1* | 8/2006 | Bach | B60T 7/104 303/89 |
| 2008/0087509 A1* | 4/2008 | Kalbeck | B60T 7/12 188/156 |
| 2009/0198427 A1* | 8/2009 | Christopher Jackson | B60T 7/122 701/70 |
| 2009/0227423 A1* | 9/2009 | Bentner | B60T 7/107 477/197 |
| 2012/0109482 A1* | 5/2012 | Yoshii | B60T 7/042 701/70 |
| 2012/0161508 A1* | 6/2012 | Beever | B60T 7/12 303/191 |
| 2014/0149011 A1* | 5/2014 | Eberling | B60T 8/1708 701/70 |
| 2014/0303879 A1* | 10/2014 | Hyodo | E02F 3/3411 701/112 |

FOREIGN PATENT DOCUMENTS

| | | |
|---|---|---|
| JP | 61-196851 A | 9/1986 |
| JP | 10-24826 A | 1/1998 |
| JP | 11-334550 A | 12/1999 |

* cited by examiner

PARKING BRAKE CONTROL DEVICE FOR TRANSPORT VEHICLE

TECHNICAL FIELD

The present invention relates to a parking brake control device for a transport vehicle and, more specifically, to a parking brake control device of a transport vehicle for preventing a silting phenomenon.

BACKGROUND ART

In a transport vehicle, for example, a dump truck used as a mining machine, a parking brake of a negative control type is provided in order to maintain a stop of a vehicle body on a slope way and the like. In the parking brake, a solenoid valve of a spool type is operated to actuate or release the brake with a hydraulic pressure using a brake caliper. Since the parking brake is the negative control type, the parking brake is actuated during a vehicle body stop and is always released during vehicle body traveling. In general, the mining machine operates continuously for a long time (about 8 hour to 12 hours). Therefore, the parking brake is not actuated during the operation.

Dust sometimes contaminates pressure oil. Therefore, when a spool does not operate for a long time, the dust collects between the spool and a valve main body that slidably covers the spool (a silting phenomenon). The silting phenomenon causes sticking of the spool to the valve main body and becomes a factor of prevention of the actuation of the parking brake. The dust is present in the pressure oil because objects in the air intrude into the pressure oil during work. In particular, the mining machine is often used in a poor environment. Therefore, dust tends to intrude into a hydraulic circuit during work.

A brake control device that prevents such sticking of the solenoid valve is described in Patent Document 1. However, the brake control device described in Patent Document 1 is based on an ABS (Anti-Lock Breaking System). As a situation in which the control of the brake control device works, traveling of the vehicle body at the speed of 40 Km/hour is assumed. However, in the mining machine, when the solenoid valve is demagnetized during traveling and the parking brake is actuated, this causes breakage of the brake itself. In Patent Document 1, suppression of noise is also taken into account. However, in the mining machine, noise is not a problem. Therefore, there is a demand for a technique for prevention of the silting phenomenon peculiar to the mining machine.

PRIOR ART DOCUMENT

Patent Document

Patent Document 1: Japanese Patent Application Laid-Open Publication No. H10-24826

SUMMARY OF THE INVENTION

Problems to be Solved by the Invention

An object of the present invention is to provide a parking brake control device for a transport vehicle that can prevent the silting phenomenon most suitably for the mining machine and, in particular, surely prevent breakage of a parking brake from being caused.

Means for Solving the Problems

In order to achieve the above object, an aspect of the present invention is directed to a parking brake control device for a transport vehicle attached to a vehicle body including a parking brake of a negative control type for maintaining a state in which rotation of wheels is stopped, the parking brake control device including a control unit for controlling movement of a spool for magnetizing or demagnetizing a solenoid valve to release or actuate the parking brake. The control unit includes: a stop determining section that determines whether the vehicle body stops traveling; an actuation command section that actuates the parking brake when the stop determining section determines that the vehicle body is stopped; and a release command section that releases the parking brake after elapse of a preset setting time after the actuation of the parking brake is started by the actuation command section.

Preferably, the control unit further includes a non-actuation time measuring section that measures whether time in which the parking brake is not actuated exceeds a preset non-actuation time.

Preferably, the stop determining section includes a speed measuring section that measures traveling speed of the vehicle body.

Preferably, the stop determining section includes an actuation switch recognizing section that recognizes whether an actuation switch for a service brake used to stop the traveling vehicle body is input to an ON state on a side for actuating the service brake.

Preferably, the stop determining section includes a hydraulic pressure measuring section that measures whether a pressure value of pressure oil for actuating the service brake used to stop the traveling vehicle body is equal to or larger than an effective value with which the vehicle body can be actually stopped.

Preferably, the stop determining section includes a duration measuring section that measures whether a state in which the vehicle body is stopped exceeds a preset duration.

Preferably, the actuation command section includes a lighting preventing section for preventing, when the parking brake is actuated by the actuation command section, lighting of an indicator lamp that is lit in conjunction with the actuation of the parking brake.

The present invention also proposes a parking brake control method for a transport vehicle including: a stop determining step for determining whether the vehicle body is stopped by the stop determining section; an actuation command step for actuating the parking brake with the actuation command section when it is determined in the stop determining step that the vehicle body is stopped; and a release command step for releasing the parking brake after elapse of a preset setting time after the parking brake is started in the actuation command step.

Preferably, the control method further includes, before the stop determining step, a non-actuation time measuring step for measuring the non-actuation time with the non-actuation time measuring section.

Advantageous Effects of the Invention

According to the present invention, when the parking brake is actuated by the actuation command section, the stop determining section determines whether the vehicle body stops traveling. Therefore, it is possible to surely prevent the parking brake from being actuated during traveling. It is possible to prevent breakage of the parking brake. It is possible to move the spool by actuating the parking brake when the vehicle body is stopped and surely remove dust collected between the spool and a valve main body that slidably covers the spool. That is, it is possible to prevent the silting phenomenon and prevent the spool from being stuck to the valve main body. The parking brake actuated by the actuation command section is automatically released by the release command section after the elapse of the setting time. Therefore, an operator does not need to perform release operation. In this way, the parking brake control device includes the control unit that automatically actuates and releases the parking brake exactly at the time when the vehicle body is stopped. Therefore, it is possible to attain prevention of the silting phenomenon suitable for the transport vehicle functioning as a mining machine that continuously operates for a long time.

In actuating the parking brake, by using the non-actuation time measuring section, it is possible to prevent the parking brake from being frequently actuated. Consequently, it is possible to prevent the life of the solenoid valve from decreasing. Therefore, it is possible to realize actuation of the parking brake necessary minimum for prevention of the silting phenomenon. It is possible to prevent wear of components that form the parking brake.

In determining the stop of the vehicle body, by using the speed measuring section, it is possible to directly recognize a stop state of the vehicle body. Therefore, it is possible to surely perform determination concerning the stop of the vehicle body.

In determining the stop of the vehicle body, by using the actuation switch recognizing section, it is possible to check an intention of the operator to stop the vehicle body. Therefore, it is possible to surely perform determination concerning the stop of the vehicle body.

In determining the stop of the vehicle body, by using the hydraulic pressure measuring section, it is possible to recognize whether the vehicle body is actually stopped using the service brake. Therefore, it is possible to surely perform determination concerning the stop of the vehicle body.

In actuating the parking brake, by using the duration measuring section, it is possible to recognize that the vehicle body is surely stopped when the state in which the vehicle body is stopped exceeds the preset duration. Therefore, for example, when the vehicle body stops at an instance and travels immediately after the stop, it is possible to prevent the parking brake from being actuated by the actuation command section. It is possible to more surely prevent breakage of the parking brake.

In actuating the parking brake, by using the lighting preventing section, lighting of the indicator lamp indicating that the parking brake is actuated is prevented. Therefore, the actuation of the parking brake for prevention of the silting phenomenon is not recognized from the outside. Therefore, since unnecessary information other than work is not given to the operator, the work is not hindered.

With the proposed control method, the stop determining step is performed to determine the stop of the vehicle body. Thereafter, the actuation command step is performed to actuate the parking brake. Thereafter, the release command step is performed to release the parking brake after the elapse of the setting time. Therefore, it is possible to automatically actuate and release the parking brake exactly at the time when the vehicle body is stopped. It is possible to attain prevention of the silting phenomenon suitable for the transport vehicle functioning as a mining machine that continuously operates for a long time.

Since the non-actuation time measuring step is performed before the stop determining step, it is possible to prevent the parking brake from being frequently actuated. Consequently, it is possible to prevent the life of the solenoid valve from decreasing. Therefore, it is possible to realize actuation of the parking brake necessary minimum for prevention of the silting phenomenon. It is possible to prevent wear of components that form the parking brake.

MODE FOR CARRYING OUT THE INVENTION

Figure 1:
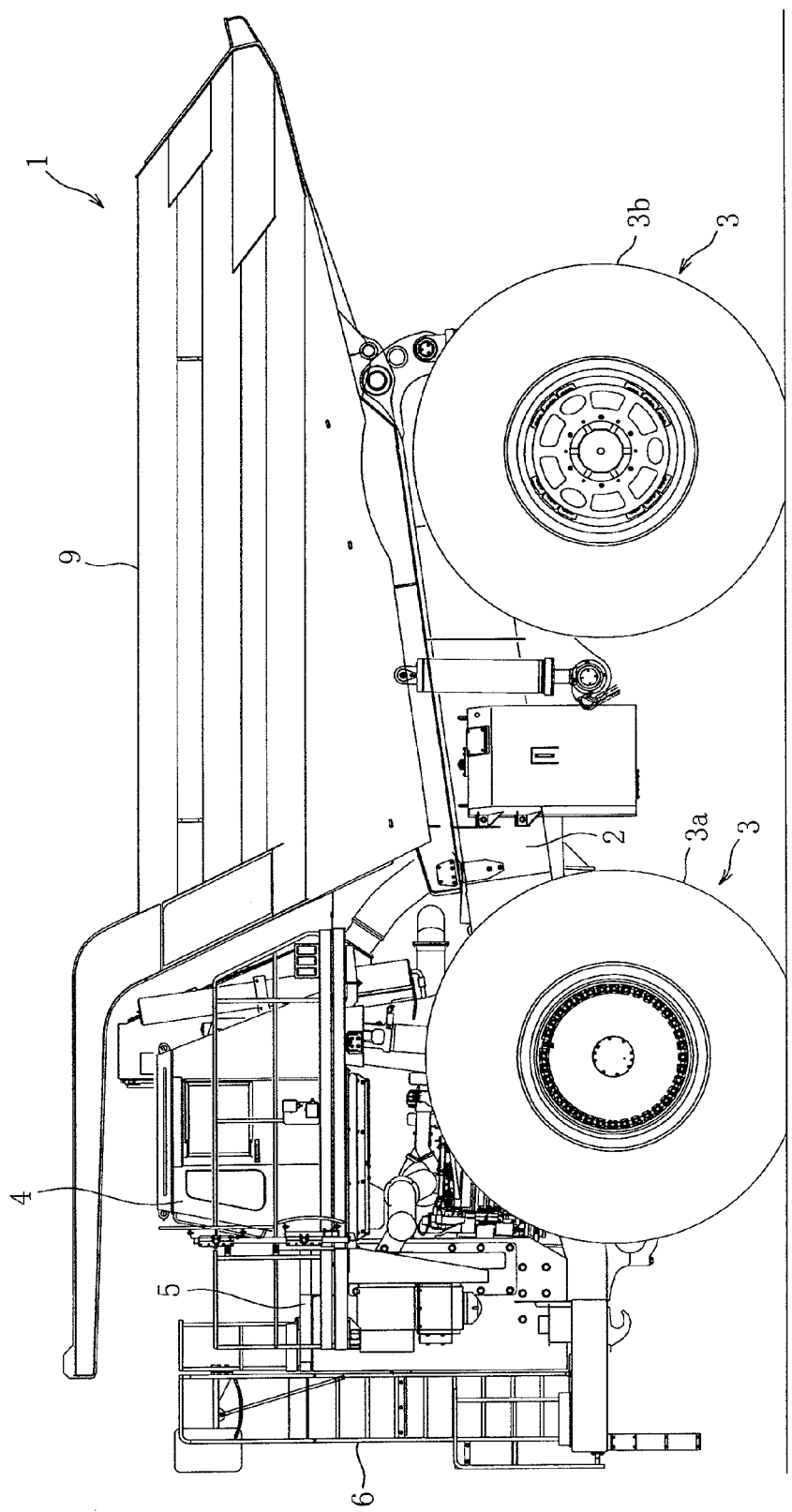
FIG. 1 is a schematic side view of a dump truck applied with a control device of the present invention.

As shown in FIG. 1, for example, a dump truck 1 used as a mining machine includes a vehicle body 2. A vessel 9 is provided in a rear part of the vehicle body 2. The vessel 9 is a carriage for temporarily storing, for example, crushed stones. Front wheels 3a and rear wheels 3a functioning as wheels 3 are provided in the vehicle body 2. A cab 4 functioning as an operator's cab is provided in a front part of the vehicle body 2. The operator gets on the cab 4 and operates the dump truck 1. A deck 5 is provided in the front of the cab 4. A ladder 6 is provided in the front of the deck 5. The operator gets on the cab 4 from the ladder 6 through the deck 5. A parking brake control device for a transport vehicle according to the present invention is used in such a mining machine.

Figure 2:
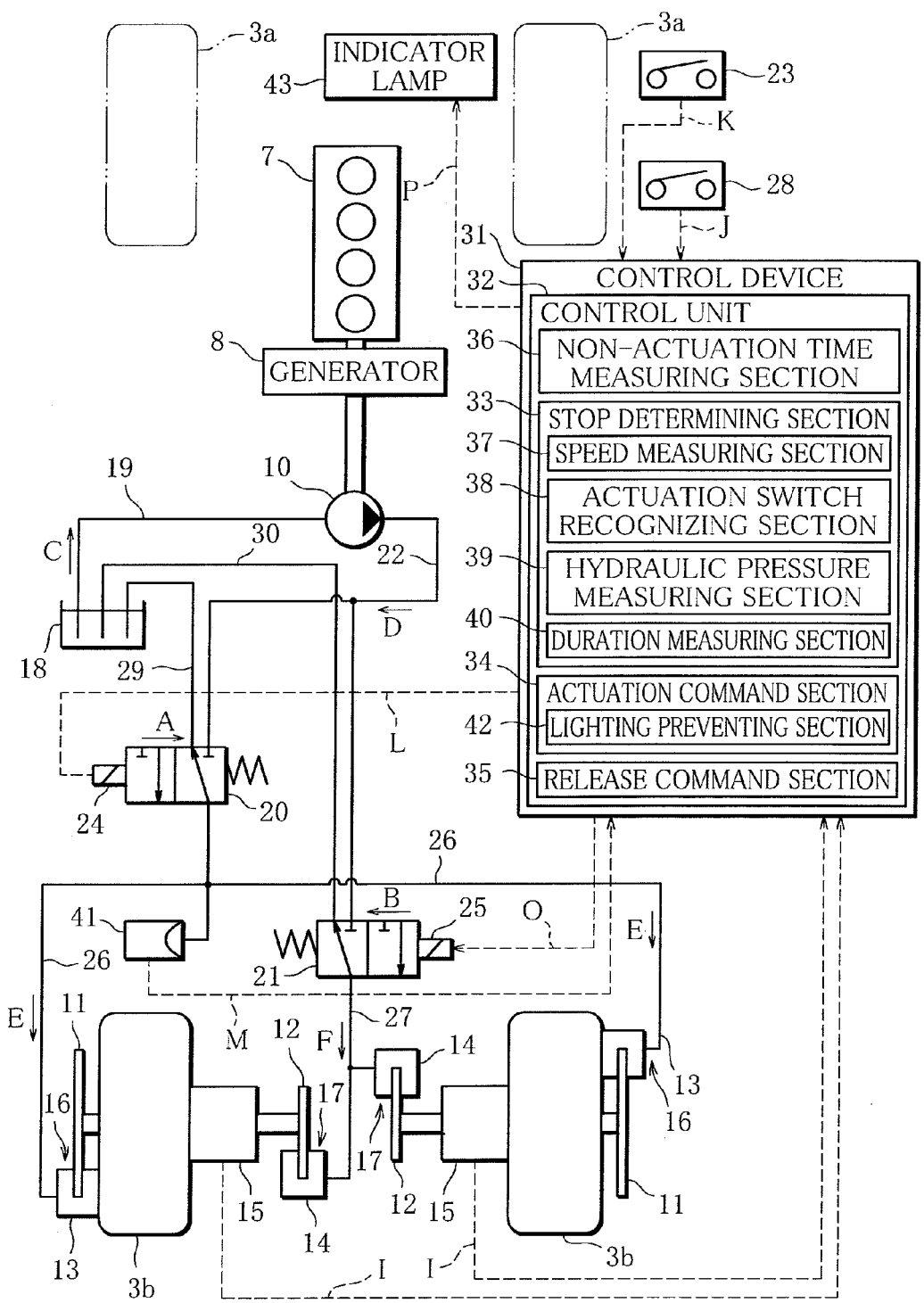
FIG. 2 is a schematic diagram showing a brake system included in the dump truck.

As shown in FIG. 2, an engine 7 and a generator 8 are provided in the vehicle body 2. An output from the engine 7 is sent to the generator 8. Power generation is performed in the generator 8. A pump 10 is connected to the generator 8. The pump 10 is driven by electric power generated by the generator 8. The pump 10 circulates pressure oil of a brake system provided in the vehicle body 2. The pressure oil is stored in an oil tank 18 provided in the vehicle body 2. The pump 10 is connected to the oil tank 18 via a suction channel 19 on an upstream side of the pump 10 and connected to each of first and second spools 20 and 21 via a feed channel 22 on a downstream side of the pump 10. The feed channel 22 branches halfway to be connected to each of the first and second spools 20 and 21. First and second solenoid valves 24 and 25 are respectively provided in the first and second spools 20 and 21. Therefore, the first and second solenoid valves 24 and 25 can be considered a spool type. Note that the first and second spools 20 and 21 slide in a not-shown valve main body.

On the other hand, in the vehicle body 2, as explained above, the front wheels 3a and the rear wheels 3b functioning as the wheels 3 are respectively provided on the left and the right. First disk rotors 11 and second disk rotors 12 are provided respectively in the rear wheels 3b. The rotors 11 and 12 rotate together with the rear wheels 3b. First brake calipers 13 are provided in the first disk rotors 11. Second brake calipers 14 are provided in the second disk rotors 12. The brake calipers 13 and 14 allow or brake rotation of the rear wheels 3b.

Specifically, service brakes 16 are formed by the first disk rotors 11 and the first brake calipers 13. Parking brakes 17 are formed by the second disk rotors 12 and the second brake calipers 14. More specifically, traveling motors 15 are attached to the rear wheels 3b. The rear wheels 3b rotate respectively receiving rotation outputs of the traveling motors 15. The second disk rotors 12 are attached to output shafts (shafts extending to the opposite sides of the rear wheels 3b) of the motors 15. That is, the rotors 12 are attached to the rear wheels 3b via the traveling motors 15. The first spool 20 is connected to each of the left and right service brakes 16 via a first channel 26. The second spool 21 is connected to each of the left and right parking brakes 17 via a second channel 27. In the cab 4, a first actuation switch 23 for actuating the service brakes 16 and a second actuation switch 28 for actuating the parking brakes 17 are provided.

The service brakes 16 are used to stop the traveling vehicle body 2. When the operator turns on the first actuation switch 23, the pump 10 is driven and, at the same time, the first solenoid valve 24 is magnetized and the first spool 20 moves (in an arrow A direction in FIG. 2). Consequently, the feed channel 22 and the first channel 26 communicate with each other via the first spool 20. The pressure oil in the oil tank 18 is sucked from the suction channel 19 (an arrow C in FIG. 2), passes through the feed channel 22 via the pump 10 (an arrow D in FIG. 2), and is fed to the first channel 26 via the first spool 20 (an arrow E in FIG. 2). Consequently, the first disk rotors 11 are braked by the first brake calipers 13 and, as a result, the wheels 3b are braked. Specifically, the first disk rotors 11 are braked using pistons (not shown in the figure) in the first brake calipers 13. Therefore, when the service brakes 16 are continuously actuated, the traveling vehicle body 2 is stopped. When the operator turns off the first actuation switch 23, the pump 10 is stopped, the first solenoid valve 24 is demagnetized and the first spool 20 returns to original position (a state shown in FIG. 2), and the pressure oil is returned to the oil tank 18 through a first return channel 29. In this state, since the service brakes 16 are released, the rotation of the rear wheels 3b is allowed.

On the other hand, the parking brakes 17 are a so-called negative control type for maintaining a state in which the rotation of the wheels 3 is stopped. Therefore, contrary to the case of the service brakes 16, when the pressure oil is supplied to the second brake calipers 14, the parking brakes 17 are released. When the operator inputs the second actuation switch 28 to a release side, the pump 10 is driven and, at the same time, the second solenoid valve 25 is magnetized and the second spool 21 moves (an arrow B direction in FIG. 2). Consequently, the feed channel 22 and the second channel 27 communicate with each other via the second spool 21. The pressure oil in the oil tank 18 is sucked from the suction channel 19 (the arrow C in FIG. 2), passes through the feed channel 22 via the pump 10 (the arrow D in FIG. 2), and is fed to the second channel 27 via the second spool 21 (an arrow F in FIG. 2). Consequently, the second brake calipers 14 release the second disk rotors 12 and the rotation of the rear wheels 3b by the traveling motors 15 is allowed. Specifically, the braking of the second disk rotors 12 is released using springs (not shown in the figure) in the second brake calipers 14. When the operator inputs the second actuation switch 28 to an actuation side, the pump 10 is stopped, the second solenoid valve 25 is demagnetized and the second spool 21 returns to the original position (the state shown in FIG. 2), and the pressure oil is returned to the oil tank 18 through a second return channel 30. In this state, since the parking brakes are actuated, the rear wheels 3b are braked.

As explained above, the silting phenomenon occurs when dust collects in the gap between the spool and the valve main body. If the spool is moved, the dust flows together with the pressure oil. Therefore, the silting phenomenon is not a problem. In the case of a mining machine such as the dump truck 1, since the operator uses the service brakes 16 during work, the silting phenomenon in the first spool 20 does not occur. However, since the parking brakes 17 are rarely used during work, the silting phenomenon occurs in the second spool 21. The present invention has an object of preventing the silting phenomenon in the second spool 21.

In order to attain this object, the present invention provides a parking brake control device 31 for a transport vehicle. The control device 31 is attached to the vehicle body 2. In the control device 31, a control unit 32 for actuating the parking brakes 17 is provided. The control unit 32 includes a stop determining section 33, an actuation command section 34, and a release command section 35. The stop determining section 33 determines whether the vehicle body 2 stops traveling. The actuation command section 34 demagnetizes the second solenoid valve 25 and actuates the parking brakes 17 when the stop determining section 33 determines that the vehicle body 2 is stopped (an arrow O in FIG. 2). The release command section 35 magnetizes the second solenoid valve 25 and releases the parking brakes 17 after a preset setting time (a setting time G explained below) elapses after the actuation of the parking brakes 17 is started by the actuation command section 34.

In this way, when the actuation command section 34 actuates the parking brakes 17, the stop determining section 33 determines whether the vehicle body 2 stops traveling. Therefore, it is possible to surely prevent the parking brakes 17 from being actuated during traveling. It is possible to prevent breakage of the parking brakes 17. It is possible to move the second spool 21 by actuating the parking brakes 17 when the vehicle body 2 is stopped and surely remove dust collected between the second spool 21 and the valve main body (not shown in the figure). That is, it is possible to prevent the silting phenomenon and prevent the second spool 21 from being stuck to the valve main body. The parking brakes 17 actuated by the actuation command section 34 are automatically released by the release command section 35 after elapse of a setting time G (see FIG. 3). Therefore, the operator does not need to perform release operation. In this way, the control device 31 includes the control unit 32 that automatically actuates and releases the parking brakes 17 exactly at the time when the vehicle body 2 is stopped. Consequently, it is possible to attain prevention of the silting phenomenon suitable for the transport vehicle functioning as a mining machine that continuously operates for a long time. The setting time G can be changed as appropriate according to, for example, the performance of the second solenoid valve 25. That is, the setting time G only has to be a degree enough for securing time necessary for enabling the second solenoid valve 25 to respond and the second spool 21 to be moved according to the response of the second solenoid valve 25. In general, the setting time G is about 2 seconds.

The control unit 32 further includes a non-actuation time measuring section 36. The non-actuation time measuring section 36 measures whether time in which the parking brakes 17 are not actuated exceeds a preset non-actuation time H (see FIG. 3). In this way, the non-actuation time measuring section 36 is used when the parking brakes 17 are actuated. Consequently, since the parking brakes 17 are actuated at a certain degree of an interval, it is possible to prevent the parking brakes 17 from being frequently actuated. Therefore, it is possible to realize actuation of the parking brakes 17 necessary minimum for prevention of the silting phenomenon. It is possible to prevent wear of components that form the parking brakes 17. The time H is, for example, 10 minutes.

The stop determining section 33 includes a speed measuring section 37 that measures traveling speed of the vehicle body 2. The traveling speed is recognized using speed sensors (not shown in the figure) mounted on the traveling motors 15. That is, information (the speed of the traveling motors 15, etc.) from the speed sensors is input to the speed measuring section 37 (an arrow I in FIG. 2). The speed measuring section 37 calculates traveling speeds concerning the traveling motors 15 respectively provided in the left and right rear wheels 3b, averages the traveling speeds, and calculates the averaged traveling speed as traveling speed of the vehicle body 2. In this way, in determining a stop of the vehicle body 2, by using the speed measuring section 37, it is possible to directly recognize a stop state of the vehicle body 2. Therefore, it is possible to surely perform determination concerning the stop of the vehicle body 2. Note that it may be determined that the vehicle body 2 is stopped when the traveling speed is 0 km/h. Taking into account that the vehicle body 2 is moved by vibration or an error range of the sensors is allowed, it may be determined that the vehicle body 2 is stopped when the speed is about 0.5 km/h. The traveling speed may be acquired by other methods.

Further, the stop determining section 33 includes an actuation switch recognizing section 38. The actuation switch recognizing section 38 recognizes whether the first actuation switch 23 for the service brakes 16 used for stopping the traveling vehicle body 2 is input to an ON state on a side for actuating the service brakes 16. In this way, in determining the stop of the vehicle body 2, by using the actuation switch recognizing section 38, it is possible to check an intention of the operator to stop the vehicle body 2. Therefore, it is possible to surely perform the determination concerning the stop of the vehicle body 2. Note that, when the operator turns on the first actuation switch 23 to actuate the service brakes 16, information concerning the actuation of the service brakes 16 is sent from the first actuation switch 23 to the actuation switch recognizing section 38 of the control device 31 (an arrow K in FIG. 2). Further, the information is sent to the first solenoid valve 24 to actually actuate the service brakes 16 (an arrow L in FIG. 2).

Further, the stop determining section 33 includes a hydraulic pressure measuring section 39. The hydraulic pressure measuring section 39 measures whether a pressure value of pressure oil for actuating the service brakes 16 used to stop the traveling vehicle body 2 is equal to or larger than an effective value with which the vehicle body 2 can be actually stopped. Specifically, the pressure value of the service brakes 16 is measured by a pressure sensor 41 provided in a channel that communicates with the first channel 26. Information from the pressure sensor 41 is sent to the hydraulic pressure measuring section 39 (an arrow M in FIG. 2). In this way, in determining the stop of the vehicle body 2, by using the hydraulic pressure measuring section 39, it is possible to recognize whether the vehicle body 2 is actually stopped using the service brakes 16. Therefore, it is possible to surely perform the determination concerning the stop of the vehicle body 2. Note that the effective value can be selected as appropriate according to a type of a mining machine. In the dump truck 1, the effective value is, for example, about 12 MPa. If the hydraulic pressure measuring section 39 is used in combination with the actuation switch recognizing section 38, even if malfunction occurs in the pressure sensor 41 and, although the service brakes 16 are not actuated, it is recognized that the service brakes 16 are actuated, it is possible to learn whether the service brakes 16 are actuated according to an intention of the operator. Therefore, it is possible to surely perform control.

Further, the stop determining section 33 includes a duration measuring section 40 that measures whether a state in which the vehicle body 2 is stopped exceeds a preset duration N. In this way, in actuating the parking brakes 17, by using the duration measuring section 40, it is possible to recognize that the vehicle body 2 is surely stopped when the state in which the vehicle body 2 is stopped exceeds the preset duration N. Therefore, for example, when the vehicle body 2 stops at an instance and travels immediately after the stop, it is possible to prevent the parking brakes 17 from being actuated by the actuation command section 34. It is possible to more surely prevent breakage of the parking brakes 17.

On the other hand, the actuation command section 34 includes a lighting preventing section 42. The lighting preventing section 42 prevents, when the parking brakes 17 are actuated by the actuation command section 34, lighting of an indicator lamp 43 that is lit in conjunction with the actuation of the parking brakes 17. That is, in the cab 4, the indicator lamp 43 for informing that the parking brakes 17 are actuated is provided. The operator recognizes the actuation or the release of the parking brakes 17 looking at the indicator lamp 43. However, when the parking brakes 17 are actuated by the actuation command section 34, the lighting preventing section 42 does not light the indicator lamp 43. Specifically, the lighting preventing section 42 sends a control signal for keeping the indicator lamp 43 extinguished (an arrow P in FIG. 2). In this way, in actuating the parking brakes 17, by using the lighting preventing section 42, the lighting of the indicator lamp 43 indicating that the parking brakes 17 are actuated is prevented. Therefore, the actuation of the parking brakes 17 for prevention of the silting phenomenon is not recognized from the outside. Therefore, since unnecessary information other than work is not given to the operator, the work is not hindered.

Figure 3:
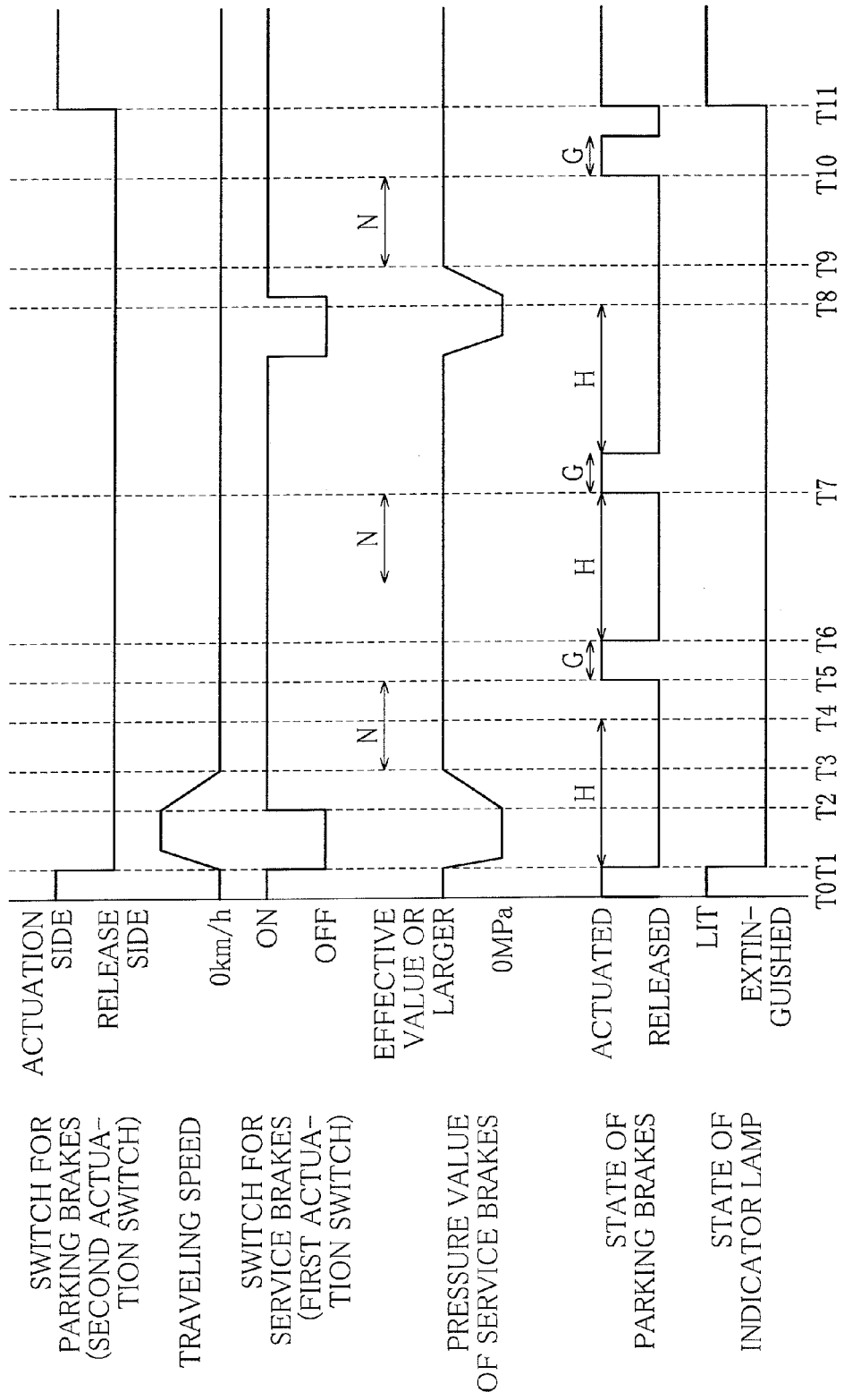
FIG. 3 is a timing chart of parking brake actuation using the control device of the present invention.
Figure 4:
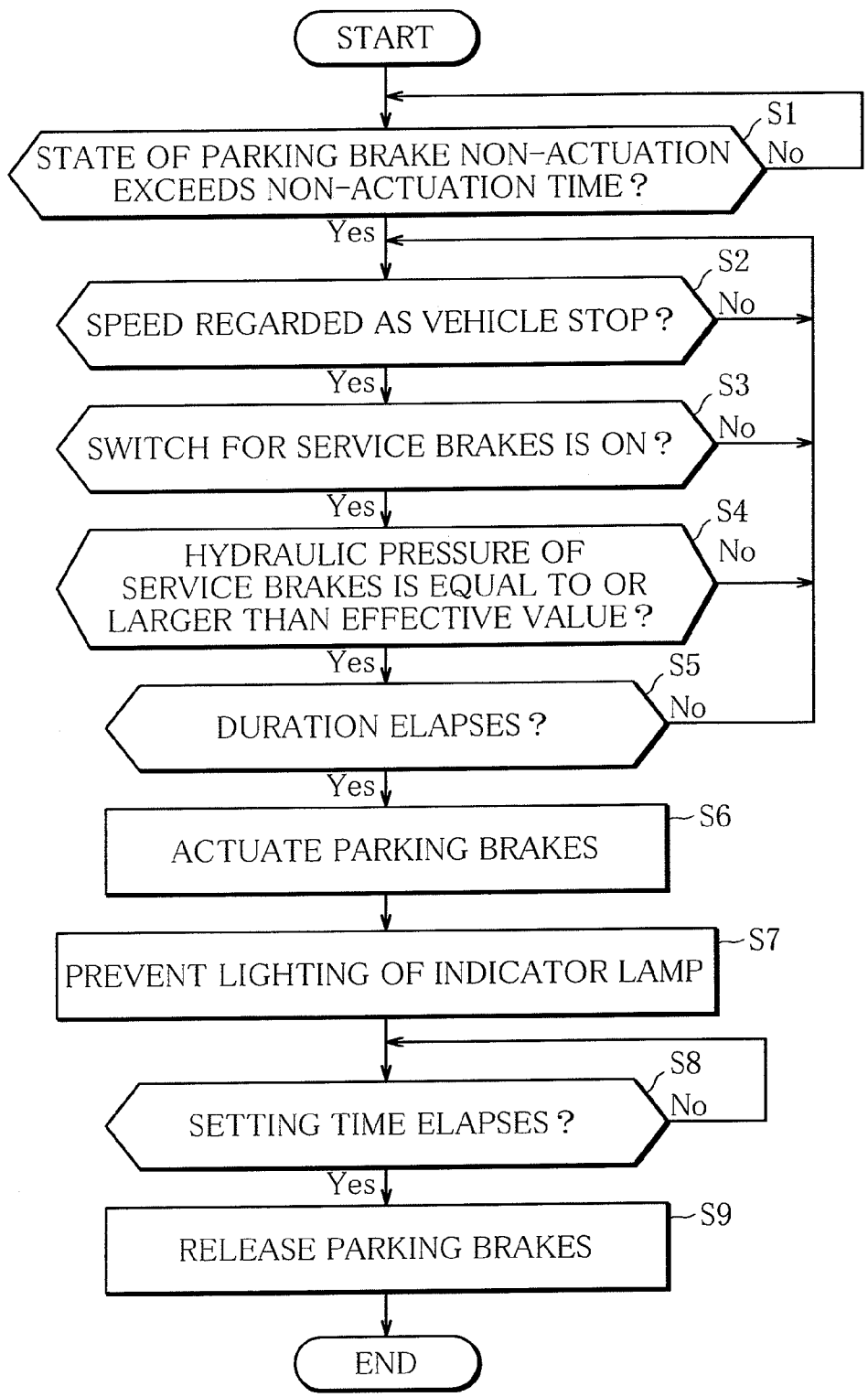
FIG. 4 is a flowchart of a parking brake control method.

Timings for actuating and releasing the parking brakes 17 using the control device 31 is explained with reference to FIG. 3. At start time T0, the vehicle body 2 is stopped using the parking brakes 17. That is, the second actuation switch 28, which is a switch for the parking brakes 17, is present on the actuation side, the traveling speed is 0 km/h (the stop state is set to 0 km/h), the first actuation switch 23, which is a switch for the service brakes 16, is on, and the pressure value of the service brakes 16 is equal to or larger than the effective value. Therefore, the parking brakes 17 are in an actuated state. The indicator lamp 43 is in a lighting state because the parking brakes 17 are actuated by the operation by the operator.

It is assumed that the operator causes the vehicle body 2 to travel at time T1. Therefore, the second actuation switch 28 is input to the release side and the parking brakes 17 are released. The first actuation switch 23 is turned off and the pressure value of the service brakes 16 starts to gradually decrease. From the time T1, the non-actuation time measuring section 36 measures whether time in which the parking brakes 17 are not actuated, that is, the non-actuation time H elapses. It is assumed that the traveling speed of the vehicle body 2 gradually increases and, while the vehicle body 2 is traveling at fixed speed, at time T2, the operator actuates the service brakes 16. Then, the first actuation switch 23 is turned on, the pressure value of the service brakes 16 gradually increases, and the traveling speed gradually decrease.

Then, it is assumed that, at time T3, the vehicle body 2 is stopped. Therefore, at time T3, the traveling speed is 0 km/h and the pressure value of the service brakes 16 is equal to or larger than the effective value. The first actuation switch 23 is kept on. Therefore, on the basis of information of the speed measuring section 37, the actuation switch recognizing section 38, and the hydraulic pressure measuring section 39, the stop determining section 33 determines that the vehicle body 2 is stopped. The stop determining section 33 further captures information from the non-actuation time measuring section 36 and determines whether this stop state exceeds the non-actuation time H. It is assumed that, at time T4, the non-actuation time H elapses from time T1. At this point, the stop determining section 33 further captures information from the duration measuring section 40. At time T4, the duration N does not elapse from time T3. At time T5, when the duration N elapses, the stop determining section 33 determines that the vehicle body 2 is surely stopped and outputs an indication to that effect to the actuation command section 34. At time T5, the actuation command section 34 actuates the parking brakes 17. Consequently, it is possible to flow the dust between the second spool 21 and the valve main body and prevent the silting phenomenon. At this point, the indicator lamp 43 is prevented from being lit by the lighting preventing section 42.

When the setting time G elapses from time T5, at time T6, the release command section 35 releases the parking brakes 17. Thereafter, it is assumed that the stop state of the vehicle body 2 further continues and the non-actuation time H and the duration N elapse from time T6 again. Then, at time T7, the actuation command section 34 actuates the parking brakes 17 again. After the setting time G elapses, the release command section 35 releases the parking brakes 17. When the non-actuation time H further elapses from time T7, at time T8, in a state in which the vehicle body 2 is not caused to travel, the operator turns off the first actuation switch 23. Consequently, the pressure value of the service brakes 16 is smaller than the effective value. In this case, the vehicle body 2 is in the stop state according to the information of the speed measuring section 37. However, the information of the actuation switch recognizing section 38 and the hydraulic pressure measuring section 39 do not indicate the stop state. Therefore, the stop determining section 33 does not determine that the vehicle body 2 is stopped. Thereafter, it is assumed that the first actuation switch 23 is turned on again at time T9 and the pressure value of the service brakes 16 exceeds the effective value. Then, if the state at time T9 continues from this point in time until time T10 when the duration N elapses, the actuation command section 34 actuates the parking brakes 17.

When the operator inputs the second actuation switch 28 to the actuation side at time T11 (an arrow J in FIG. 2), the parking brakes 17 are actuated. In this case, since the parking brakes 17 are actuated according to an intention of the operator, the indicator lamp 43 is lit.

Next, a parking brake control method for a transport vehicle is explained. This method is performed using the control device 31.

First, the non-actuation time measuring section 36 included in the control unit 32 measures whether time in which the parking brakes 17 are not actuated exceeds the preset non-actuation time H (step S1). By measuring the time H, it is possible to prevent the parking brakes 17 from being frequently actuated. When the time H does not elapse, the non-actuation time measuring section 36 performs step S1 again. When the time H elapses, subsequently, the stop determining section 33 determines whether the vehicle body 2 is stopped. This determination is performed by measuring, with the speed measuring section 37, actual speed of the vehicle body 2 (step S2), recognizing, with the actuation switch recognizing section 38, whether the actuation switch 23 for the service brakes 16 is turned on by the operator (step S3), and measuring, with the hydraulic-pressure measuring section 39 whether the hydraulic pressure of the service brakes is equal to or larger than the effective value (step S4). Further, if the conditions in step S2 to step S4 are satisfied, the duration measuring section 40 measures whether the duration N elapses in that state (step S5). If steps S2 to S5 are satisfied, the stop determining section 33 determines that the vehicle body 2 is surely stopped. If the conditions from step S2 to step S5 are not satisfied, the processing returns to step S2. If only at least one of steps S2 to S4 is satisfied, the processing may proceeds to step S5.

If step S2 to step S5 are satisfied and it is determined that the vehicle body 2 is stopped, the actuation command section 34 actuates the parking brakes 17 (step S6). In this way, it is possible to move the second spool 21 by actuating the parking brakes 17 when the vehicle body 2 is stopped and surely remove dust collected between the second spool 21 and the valve main body (not shown in the figure). That is, it is possible to prevent the silting phenomenon and prevent the second spool 21 from being stuck to the valve main body. Lighting of the indicator lamp 43 is prevented by the lighting preventing section 42 (step S7). That is, the indicator lamp indicating that the parking brakes 17 are actuated maintains an extinguished state. The release command section 35 measures whether the setting time G elapses (step S8). When the setting time G does not elapse, the release command section 35 performs step S8 again. When the setting time G elapses, the release command section 35 releases the parking brakes 17 (step S9). Consequently, the parking brakes 17 actuated by the actuation command section 34 are automatically released by the release command section 35 after the elapse of the setting time G. Therefore, the operator does not need to perform release operation.

According to the method explained above, it is possible to automatically actuate and release the parking brakes 17 exactly at the time when the vehicle body 2 is stopped. Therefore, it is possible to attain prevention of the silting phenomenon suitable for the transport vehicle functioning as a mining machine that continuously operates for a long time.

EXPLANATION OF REFERENCE SIGNS

1 Dump truck
2 Vehicle body
3 Wheels
4 Cab
5 Deck
6 Ladder
7 Engine
8 Generator
9 Vessel
10 Pump
11 First disk rotors
12 Second disk rotors
13 First brake calipers
14 Second brake calipers
15 Traveling motors
16 Service brakes 17 Parking brakes
18 Oil tank
19 Suction channel
20 First spool
21 Second spool
22 Feed channel
23 First actuation switch
24 First solenoid valve
25 Second solenoid valve
26 First channel
27 Second channel
28 Second actuation switch
29 First return channel
30 Second return channel
31 Control device
32 Control unit
33 Stop determining section
34 Actuation command section
35 Release command section
36 Non-actuation time measuring section
37 Speed measuring section
38 Actuation switch recognizing section
39 Hydraulic pressure measuring section
40 Duration measuring section
41 Pressure sensor
42 Lighting preventing section
43 Indicator lamp

The invention claimed is:

1. A parking brake control device for a transport vehicle attached to a vehicle body including a parking brake of a negative control type for maintaining a state in which rotation of wheels is stopped, the parking brake control device comprising a control unit for controlling movement of a spool for magnetizing or demagnetizing a solenoid valve to release or actuate the parking brake, wherein the control unit includes:
a stop determining section that determines whether the vehicle body stops traveling;
an actuation command section that actuates the parking brake when the stop determining section determines that the vehicle body is stopped;
a release command section that releases the parking brake after elapse of a preset setting time after the actuation of the parking brake is started by the actuation command section; and
a non-actuation time measuring section that measures whether time in which the parking brake is not actuated exceeds a preset non-actuation time.

2. The parking brake control device for the transport vehicle according to claim 1, wherein the stop determining section includes an actuation switch recognizing section that recognizes whether an actuation switch for a service brake used to stop the traveling vehicle body is input to an ON state on a side for actuating the service brake.

3. The parking brake control device for the transport vehicle according to claim 2, wherein the stop determining section includes a hydraulic pressure measuring section that measures whether a pressure value of pressure oil for actuating the service brake used to stop the traveling vehicle body is equal to or larger than an effective value with which the vehicle body can be actually stopped.

4. The parking brake control device for the transport vehicle according to claim 3, wherein the stop determining section includes a duration measuring section that measures whether a state in which the vehicle body is stopped exceeds a preset duration.

5. A parking brake control device for a transport vehicle attached to a vehicle body including a parking brake of a negative control type for maintaining a state in which rotation of wheels is stopped, the parking brake control device comprising a control unit for controlling movement of a spool for magnetizing or demagnetizing a solenoid valve to release or actuate the parking brake, wherein the control unit includes:
a stop determining section that determines whether the vehicle body stops traveling;
an actuation command section that actuates the parking brake when the stop determining section determines that the vehicle body is stopped;
a release command section that releases the parking brake after elapse of a preset setting time after the actuation of the parking brake is started by the actuation command section; and
a non-actuation time measuring section that measures whether time in which the parking brake is not actuated exceeds a preset non-actuation time, and prevents the actuation command section from actuating the parking brake time until the time which the parking brake is not actuated exceeds the preset non-actuation time.

6. The parking brake control device for the transport vehicle according to claim 5, wherein the stop determining section includes an actuation switch recognizing section that recognizes whether an actuation switch for a service brake used to stop the traveling vehicle body is input to an ON state on a side for actuating the service brake.

7. The parking brake control device for the transport vehicle according to claim 6, wherein the stop determining section includes a hydraulic pressure measuring section that measures whether a pressure value of pressure oil for actuating the service brake used to stop the traveling vehicle body is equal to or larger than an effective value with which the vehicle body can be actually stopped.

8. The parking brake control device for the transport vehicle according to claim 7, wherein the stop determining section includes a duration measuring section that measures whether a state in which the vehicle body is stopped exceeds a preset duration.

* * * * *